US009313621B2

(12) United States Patent
Tham et al.

(10) Patent No.: US 9,313,621 B2
(45) Date of Patent: Apr. 12, 2016

(54) METHOD FOR AUTOMATICALLY SWITCHING TO A CHANNEL FOR TRANSMISSION ON A MULTI-WATCH PORTABLE RADIO

(71) Applicant: MOTOROLA SOLUTIONS, INC, Schaumburg, IL (US)

(72) Inventors: Mun Yew Tham, Bayan Lepas (MY); Bing Yee Hong, Bayan Lepas (MY); Ting Fook Tang, Bayan Lepas (MY); Chia Chuan Wu, Butterworth (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 88 days.

(21) Appl. No.: 14/253,521

(22) Filed: Apr. 15, 2014

(65) Prior Publication Data
US 2015/0296351 A1 Oct. 15, 2015

(51) Int. Cl.
*H04B 7/00* (2006.01)
*H04W 4/10* (2009.01)
*H04B 1/46* (2006.01)
*H04W 88/06* (2009.01)
*H04W 76/00* (2009.01)
*H04W 84/08* (2009.01)

(52) U.S. Cl.
CPC . *H04W 4/10* (2013.01); *H04B 1/46* (2013.01); *H04W 76/005* (2013.01); *H04W 84/08* (2013.01); *H04W 88/06* (2013.01)

(58) Field of Classification Search
USPC .................................................. 455/517–521
See application file for complete search history.

(56) References Cited

U.S. PATENT DOCUMENTS 5,689,802 A 11/1997 Luzzatto
6,137,887 A * 10/2000 Anderson .............. H04R 3/005
381/111

(Continued)

FOREIGN PATENT DOCUMENTS

GB 2375461 A 11/2002
WO 2006108416 A1 10/2006
WO 2014190508 A1 12/2014

OTHER PUBLICATIONS

IP.com—"Radio Dual PTT/Button Press Option Enable"—Motorola, Inc., Christenson, et al—Original Publication Date—December 1, 1991; IP.com No.: 1PCOM000006329D; Electronic Publication: December 25, 2001—Copyright—Motorola, Inc. (Dec. 1981).

(Continued)

*Primary Examiner* — Fayyaz Alam

(57) ABSTRACT

A method for automatically switching to a channel for transmission on a portable radio is provided. In operation, a first microphone is assigned to respond to communications received on a primary channel and a second microphone is assigned to respond to communications received on a non-primary channel. The portable radio receives independent audio communications simultaneously on the primary channel and the non-primary channel when operating in a multi-watch mode. The portable radio determines a signal gain corresponding to a voice command received at the first and second microphones. When the signal gain for the first microphone is larger than the signal gain for the second microphone, the portable radio switches to a first talk-back channel to respond to communications received on the primary channel. Otherwise, the portable radio switches to a second talk-back channel to respond to communications received on the at least one non-primary channel.

24 Claims, 10 Drawing Sheets

(56) References Cited

U.S. PATENT DOCUMENTS

| | | | |
|---|---|---|---|
| 6,952,590 B2* | 10/2005 | Legare | H04M 1/72513 455/421 |
| 8,428,573 B2 | 4/2013 | Martz et al. | |
| 8,676,243 B2 | 3/2014 | Blanco | |
| 8,676,244 B2 | 3/2014 | Blanco | |
| 2003/0031327 A1 | 2/2003 | Bakis et al. | |
| 2007/0142072 A1* | 6/2007 | Lassally | H04B 1/44 455/518 |
| 2012/0051548 A1* | 3/2012 | Visser | G10L 21/0208 381/56 |
| 2012/0276940 A1* | 11/2012 | Lever | H04B 1/3888 455/518 |
| 2012/0284023 A1 | 11/2012 | Vitte et al. | |
| 2013/0281034 A1* | 10/2013 | Mazzeo | H04W 4/10 455/90.2 |
| 2014/0056443 A1 | 2/2014 | Yui et al. | |
| 2014/0099910 A1 | 4/2014 | Corretjer et al. | |
| 2015/0230066 A1* | 8/2015 | Subbaramoo | H04M 1/605 455/416 |

OTHER PUBLICATIONS

Galan et al—U.S. Appl. No. 14/091,012, filed Nov. 26, 2013; "System for Enabling Duplex Communication on Portable Radios".

Corresponding International Application PCT/US2015/022112—International Search Report with Written Opinion, mailed Jun. 19, 2015.

* cited by examiner

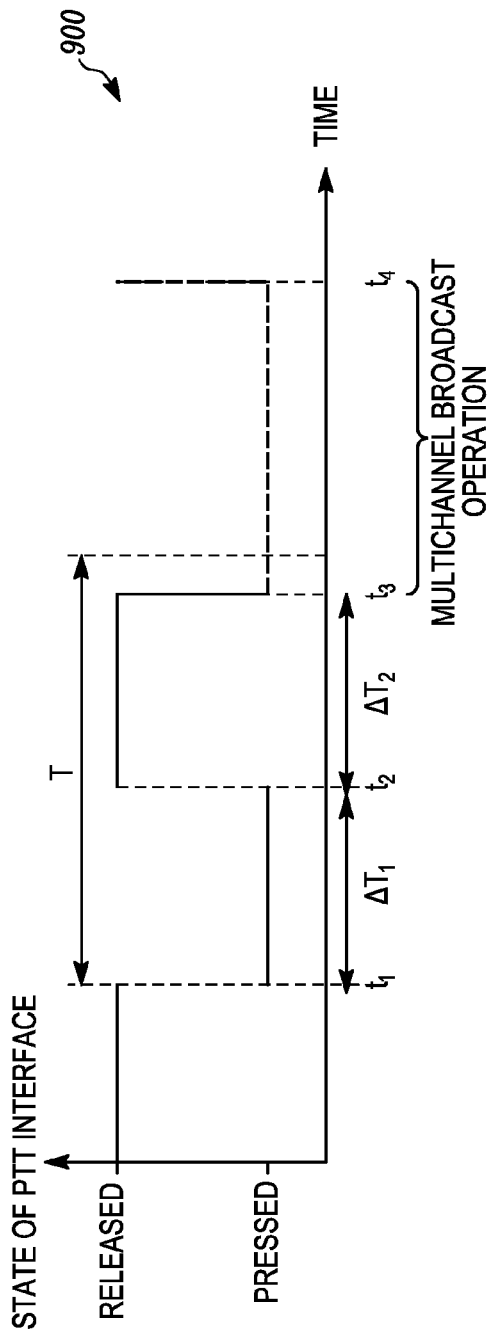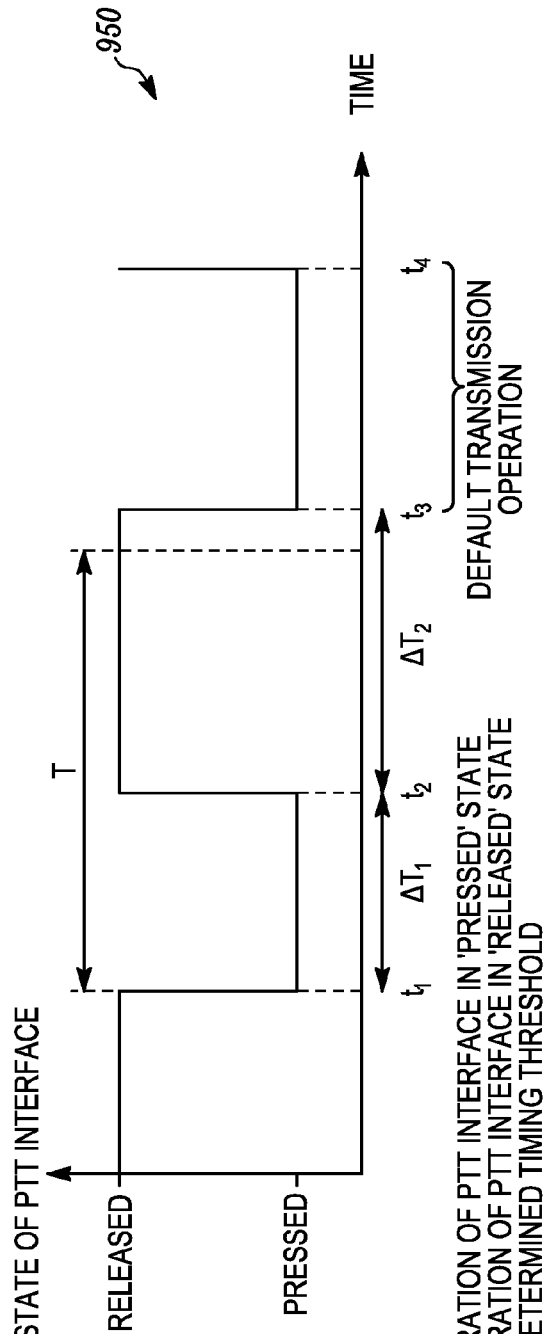

METHOD FOR AUTOMATICALLY SWITCHING TO A CHANNEL FOR TRANSMISSION ON A MULTI-WATCH PORTABLE RADIO

FIELD OF THE DISCLOSURE

The present disclosure relates generally to portable radios and more particularly to a method for automatically switching to a channel for transmission on a multi-watch portable radios.

BACKGROUND OF THE INVENTION

Portable radios such as hand-held radios are utilized within a variety of public safety environments, such as law enforcement, fire rescue, and emergency medical environments to name a few. Currently, public safety personnel working in the field use two physical radios in order to monitor more than one channel at a time. Using two radios can be cumbersome, and managing the communications from two radios independently can be challenging and may lead to confusion.

Accordingly, there is a need for an improved means for managing communications received on multiple channels.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 9A shows a graph illustrating a proper double press operation of a push-to-talk interface on a portable radio in accordance with some embodiments.

FIG. 9B shows a graph illustrating an improper double press operation of a push-to-talk interface on a portable radio in accordance with some embodiments.

Figure 1:
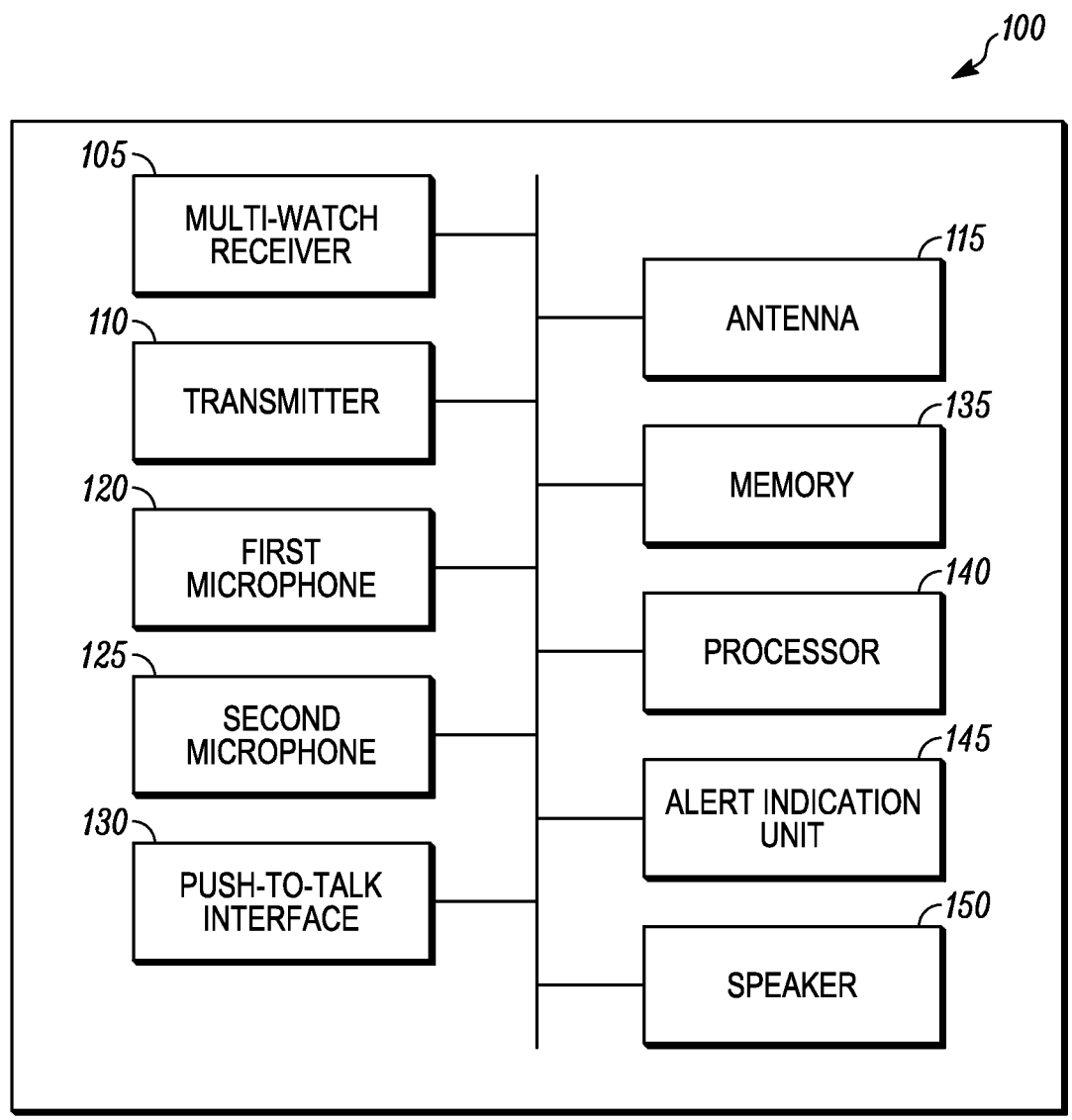
FIG. 1 is a block diagram of a portable radio in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method for automatically switching to a channel for transmission on a portable radio is provided. In operation, a first microphone of the portable radio is assigned to respond to communications received on a primary channel, and a second microphone of the portable radio is assigned to respond to communications received on at least one non-primary channel. The portable radio receives independent audio communications simultaneously on the primary channel and the non-primary channel when the portable radio communication device is operating in a multi-watch mode. In response to detecting a voice command received at the first or second microphones, the portable radio determines a signal gain corresponding to the received voice command for both the first and second microphones. When the signal gain for the first microphone is larger than the signal gain for the second microphone, the portable radio switches to a first talk-back channel to respond to communications received on the primary channel. When the signal gain for the second microphone is larger than the signal gain for the first microphone, the portable radio switches to a second talk-back channel to respond to communications received on the at least one non-primary channel.

FIG. 1 is a block diagram of a portable radio 100 operating in accordance with various embodiments. The portable radio 100 may be one of a two-way communication radio, a remote speaker microphone (RSM) accessory coupled to the two-way communication radio, or other collaborative electronic accessory device operating with a multi-watch capable radio. In accordance with the embodiments, the portable radio 100 is configured to operate in a multi-watch mode. As used herein, the term "multi-watch mode" signifies a receiver mode of the portable radio 100 in which the portable radio 100 receives (multiple) independent audio communications simultaneously on at least two frequency channels, including a primary channel and at least one non-primary channel. Each independent audio communication corresponds to radio frequency (RF) signals received on one particular frequency channel. Multi-watch mode operation of the portable radio 100 further allows a user to listen to audio communications received from multiple channels simultaneously. For example, in public safety environments involving an emergency situation, incident commanders will be able to listen to communications from multiple emergency responder groups (for example, firefighters and police groups) simultaneously, either on private or group calls when the portable radio 100 operates in multi-watch mode.

The portable radio 100 comprises a multi-watch receiver 105 and transmitter 110 coupled to at least one antenna 115, first microphone 120, second microphone 125, push-to-talk (PTT) interface 130, memory 135, processor 140, alert indication unit 145, and speaker 150. In some embodiments, the portable radio 100 is an integrated unit containing at least all the elements depicted in FIG. 1 for operating in multi-watch mode. Alternatively, the portable radio 100 can comprise a collection of appropriately interconnected unit or devices, wherein such units or devices perform functions that are equivalent to the functions performed by the components of the portable radio 100. The multi-watch receiver 105 of the portable radio 100 is configured to receive multiple independent RF signals simultaneously on the primary channel and at least one non-primary channel via the at least one antenna 115. In one embodiment, when the portable radio 100 operates in a dual-watch mode, the multi-watch receiver 105 is configured to receive independent communications simultaneously on two channels i.e. a primary channel and a non-primary channel. In one embodiment, the audio communications received simultaneously on the primary and non-primary channels may originate from a single communication system, such as a public safety-long term evolution (PS-LTE) communication system or a land mobile radio communication (LMR) system. In another embodiment, the audio communications received simultaneously on the primary and non-primary channels may originate from different communication systems, for example, audio communications received on the primary channel can originate from a first communication system such as the LMR system, and audio communications received on a non-primary channel can originate from a second communication system such as the PS-LTE system. The transmitter 110 is configured to be tuned to a transmission channel (referred herein as a talk-back channel) to respond to communications received on a primary channel or a non-primary channel. The multi-watch receiver 105, transmitter 110, and antenna 115 include appropriate circuitry to enable digital or analog communications over a wireless communication channel. Further, the at least one antenna 115 includes any known or developed structure for receiving electromagnetic energy in the RF spectrum. In one embodiment, the at least one antenna 115 may be a single receiving antenna that simultaneously monitors wireless communications on both the primary and non-primary channels. In another embodiment, the at least one antenna 115 may be a single receiving antenna that periodically toggles to monitor wireless communications on both the primary and non-primary channels. Other antenna arrangements are also feasible.

The portable radio 100 includes a plurality of microphones including at least a first microphone 120 and a second microphone 125 that are designed to receive acoustic signals from a source, for example, voice input or command from a user. In one embodiment, the first and second microphones 120, 125 are located on different sides of a housing of the portable radio 100. In one embodiment, each of the first and second microphones 120, 125 includes an array of microphone elements. Each microphone element may include an acoustic transducer that converts acoustical energy to electrical energy. In accordance with embodiments of the present disclosure, the portable radio 100 is configured to assign the first microphone 120 for the user to respond to communications received on the primary channel and the second microphone 125 for the user to respond to communications received on the secondary channel. In one embodiment, the assignment of the first microphone 120 to respond to communications on the primary channel and the second microphone 125 to respond to communications on the non-primary channel is configured in the portable radio 100 based on a user input. In alternative embodiments, this assignment may be pre-configured by default in the portable radio 100, and can be further modified, according to the requirements of the user based on a user input.

The PTT interface 130 supports half duplex communication in the portable radio 100. The PTT interface 130 may include a switch or button that is pressed and held down as a user provides voice command (speech input) at a microphone (first microphone 120 or second microphone 125) to respond to audio communications received on the primary or non-primary channels. In accordance with some embodiments of the present disclosure, the portable radio 100 may use different talk-back channels to respond to audio communications received on primary and non-primary channel via the transmitter 110. For example, the portable radio 100 may switch to a first talk-back channel to respond to communications received on the primary channel and a second talk-back channel to respond to communications received on the non-primary channel.

The memory 135 of the portable radio 100 stores operational and programming instructions. The memory 135 can be an integrated-circuit (IC) memory chip containing any form of random-access memory (RAM), a floppy disk, a compact disk with read write (CD-RW), a hard disk drive, a digital versatile disc with read write (DVD-RW), a flash memory card, external subscriber identity module (SIM) card or any other non-transitory medium for storing digital information. In accordance with the embodiments, the memory 135 of the portable radio 100 stores information related to the assignment of the microphones. In one embodiment, the memory 135 may include a look-up table that identifies specific microphones which are used for responding to communications on primary and non-primary channels. In one example, the look-up table may identify that the user or device has defined the first microphone 120 to be used for responding to communications on the primary channel, and the second microphone 125 to be used for responding to communications on the non-primary channel.

The processor 140 of the portable radio 100 includes one or more microprocessors, microcontrollers, DSPs (digital signal processors), state machines, logic circuitry, or any other device or devices that process information based on operational or programming instructions stored in the memory 135. In accordance with the embodiments of the present disclosure, the processor 140 is configured to automatically switch to a talk-back channel for transmission when a user activates the push-to-talk interface 130 and speaks into a first microphone 120 or second microphone 125 of the portable radio 100. In particular, the portable radio 100 determines which of the primary or non-primary channels that the user is intending to respond based on whether the voice command of the user is received at the first or second microphones 120, 125 and further automatically switches to a corresponding talk-back channel (first talk-back or second talk-back channel) for transmission. In other words, the processor 140 automatically identifies the microphone (first microphone 120 or second microphone 125) that the user is talking to and automatically switches to a talk-back channel for transmission based on the identified microphone. In one embodiment, when a voice command is detected at the first or second microphones 120, 125, the processor 140 identifies the microphone that is receiving the voice command based on the signal gain associated with a voice command received at the first and second microphones 120, 125. When the signal gain for the first microphone 120 is larger than the signal gain for the second microphone 125, the processor 140 automatically switches to a corresponding talk-back channel i.e. first talk-back channel to transmit an audio signal corresponding to the voice command (received at the first microphone 120) to respond to audio communications received on the primary channel. On the other hand, when the signal gain for the second microphone 125 is larger than the signal gain for the first microphone 120, the processor 140 automatically switches to a corresponding talk-back channel i.e. second talk-back channel to transmit an audio signal corresponding to the voice command (received at the second microphone 125) to respond to audio communications received on the non-primary channel.

In one embodiment, when the processor 140 detects a double press operation (see FIG. 9A) of the PTT interface 130 with a pre-determined timing between the presses at the portable radio 100, the processor 140 initiates a multichannel broadcast operation by concurrently transmitting an audio signal corresponding to the voice command received at the first or second microphones 120,125 on both the first and second talk-back channels. As used herein, the term 'multichannel broadcast operation' indicates a transmission mode in which the portable radio 100 automatically switches to multiple transmission channels (e.g. first and second talk-back channels) in order to respond to communications received on the primary and non-primary channels. In another embodiment, when the processor 140 detects a double press operation of the push-to-talk interface 130 with a pre-determined timing between the presses at the portable radio 100, the processor 140 initiates a multichannel broadcast operation by switching to the first talk-back channel by default to transmit an audio signal corresponding to the voice command received at the first or second microphones 120,125 to respond to audio communications received on the primary channel. In this case, the processor 140 concurrently records the audio signal being transmitted on the first talk-back channel, and further when a release operation of the PTT interface 130 is detected, the processor 140 automatically switches to the second talk-back channel to transmit the recorded audio signal to respond to communications received on the non-primary channel. In a further embodiment, when the processor 140 detects a double press operation of the PTT interface 130 with a pre-determined timing between the presses at the portable radio 100, the processor 140 determines which of the first or second microphones 120, 125 has a larger audio signal gain corresponding to the received voice command. When the processor 140 detects that the first microphone 120 has a larger audio signal gain, the processor 140 initiates the multichannel broadcast operation by transmitting the audio signal corresponding to the voice command on the first talk-back channel to respond to communications received on the primary channel and concurrently recording the transmission on the first talk-back channel. Further, when a release operation of the PTT interface 130 is detected, the processor 140 automatically transmits the recorded audio signal by switching to the second talk-back channel to respond to communications received on the non-primary channel. On the other hand, when the processor 140 detects that the audio signal gain for second microphone 125 is larger than the audio signal gain for the first microphone 120, the processor 140 initiates the multichannel broadcast operation by transmitting the audio signal corresponding to the voice command on the second talk-back channel to respond to communications received on the non-primary channel and concurrently recording the transmission on the second talk-back channel. Further, when a release operation of the PTT interface 130 is detected, the processor 140 automatically transmits the recorded audio signal by switching to the first talk-back channel to respond to communications received on the primary channel.

The portable radio 100 may further include one or more input/output interfaces (not shown) such as keypad(s), display(s), volume control interface(s), channel control knob, encryption on/off switch, and the like. In accordance with the various embodiments, the portable radio 100 additionally comprises the alert indication unit 145. The alert indication unit 145 is activated to provide a visual (for example, via a display or a plurality of light emitting diodes (LED)) or audible alert (for example, via a speaker 150) to a user. In one embodiment, the alert is presented to the user in the form of an audio beep. In another embodiment, the alert is presented to the user in the form of a blinking LED from a plurality of LEDs present on the portable radio 100. In accordance with the embodiments, when the processor 140 detects that the audio signal gain for the first microphone 120 is larger than the audio signal gain for the second microphone 125, the processor 140 activates the alert indication unit 145 to provide an alert to the user to indicate that the communications received on the primary channel is being responded to on the first talk-back channel. On the other hand, when the processor 140 detects that the audio signal gain for the second microphone 125 is larger than the audio signal gain for the first microphone 120, the processor 140 activates the alert indication unit 145 to provide an alert to the user to indicate that the communications received on the non-primary channel is being responded to on the second talk-back channel. In accordance with some embodiments, the alert indication unit 145 is also activated whenever the processor 140 initiates the multichannel broadcast operation to indicate to the user that the audio signal corresponding to the voice command received at the first or second microphones 120, 125 is transmitted on both the primary and non-primary channels. The speaker 150 of the portable radio 100 plays audio sounds corresponding to the RF signals received on the primary and non-primary channels, tones, or alerts within an audible frequency range that can be heard by the user. In accordance with some embodiments, the speaker 150 of the portable radio 100 is configured to play the audio communications received on the primary channel in a manner that is louder than the audio communications received on the non-primary channel.

Figure 2:
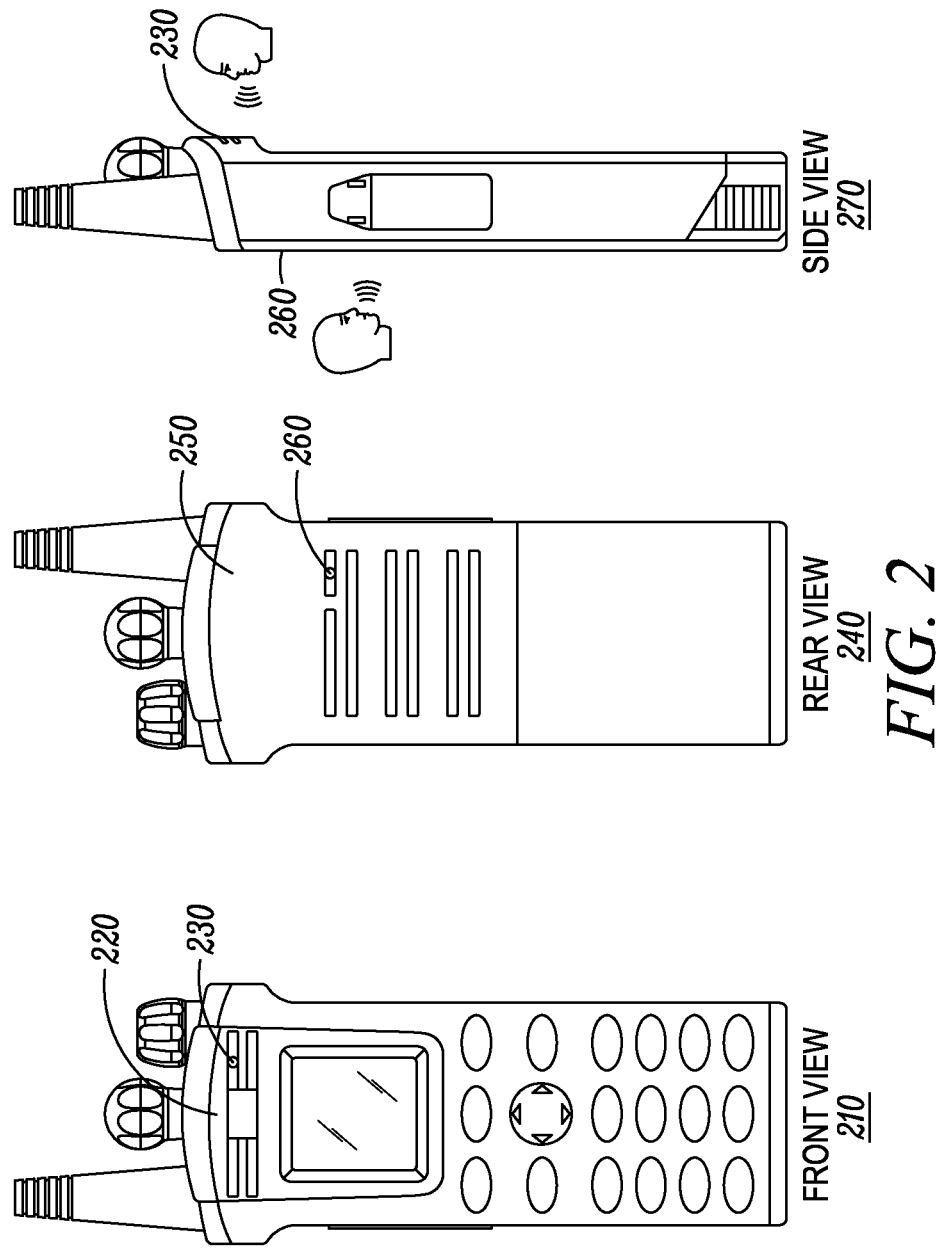
FIG. 2 illustrates different views of a portable radio in accordance with some embodiments.

Referring to FIG. 2, different views of the portable radio 100 is shown. Front view 210 shows a front surface 220 of a housing of the portable radio 100 in which a front microphone 230 is located. The front microphone 230 shown in FIG. 2 corresponds to the first microphone 120 described with reference to FIG. 1. In one embodiment, the portable radio 100 may include a plurality of such front microphones 230 that are co-located on the front surface 220 of the portable radio 100. In one embodiment, the front microphone 230 is assigned, by default, to respond to communications received on the primary channel. Rear view 240 shows a rear surface 250 of a housing of the portable radio 100 in which a rear microphone 260 is located. The rear microphone 260 shown in FIG. 2 corresponds to the second microphone 125 described with reference to FIG. 1. In one embodiment, the portable radio 100 may include a plurality of such rear microphones 260 that are co-located on the rear surface 250 of the portable radio 100. In one embodiment, the rear microphone 260 is assigned, by default, to respond to communications received on the primary channel. Side view 270 of the portable radio 100 illustrates the relative locations of the front and rear microphones 230, 260.

In accordance with embodiments of the present disclosure, the portable radio 100 is configured to identify the front or rear microphones 230, 260 that the user is speaking to and automatically switch to a corresponding first or second talk-back channel for transmission. In one scenario, when there is a need to respond to audio communications received on the non-primary channel, the user can flip to the rear surface 250 of the portable radio 100 and speak into the rear microphone 260. Typically, when the user speaks directly towards the rear microphone 260, the signal gain at the rear microphone 260 is larger than the signal gain at the front microphone 230. Based on the larger audio signal gain at the rear microphone 260, the portable radio 100 detects that the user is speaking into the rear microphone 260 and therefore automatically switches to a second talk-back channel to respond to audio communications received on the non-primary channel. The second talk-back channel represents a transmission channel that carries audio signals corresponding to the voice command detected at the rear microphone 260 in response to audio communications received on the non-primary channel. In one embodiment, the transmission channel i.e. second talk-back channel is also the non-primary channel. In this case, when the portable radio 100 detects an activation of the push-to-talk interface 130 and larger audio signal gain for the voice command received at the rear microphone 260, the portable radio 100 automatically switches from the multi-watch mode (receive mode) to a transmit mode in which the transmitter 110 is automatically tuned to a frequency of the non-primary channel to transmit audio communications to respond to communications received on the non-primary channel.

Alternatively, when the portable radio 100 detects a larger signal gain for a voice command detected at the front microphone 230, the portable radio 100 assumes that the user is intending to respond to communications received on the primary channel and automatically switches to a first talk-back channel to respond to audio communications received on the non-primary channel. The first talk-back channel represents a talk-back channel that carries audio signals corresponding to the voice command detected at the first microphone 120 in response to audio communications received on the primary channel. In one embodiment, the transmission channel i.e. first talk-back channel is also the primary channel. In this case, when the portable radio 100 detects an activation of the PTT interface 130 and larger audio signal gain for the voice command received at the front microphone 230, the portable radio 100 automatically switches from the multi-watch mode to a transmit mode in which the transmitter 110 is automatically tuned to a frequency of the primary channel to transmit audio communications to respond to communications received on the primary channel.

Figure 3:
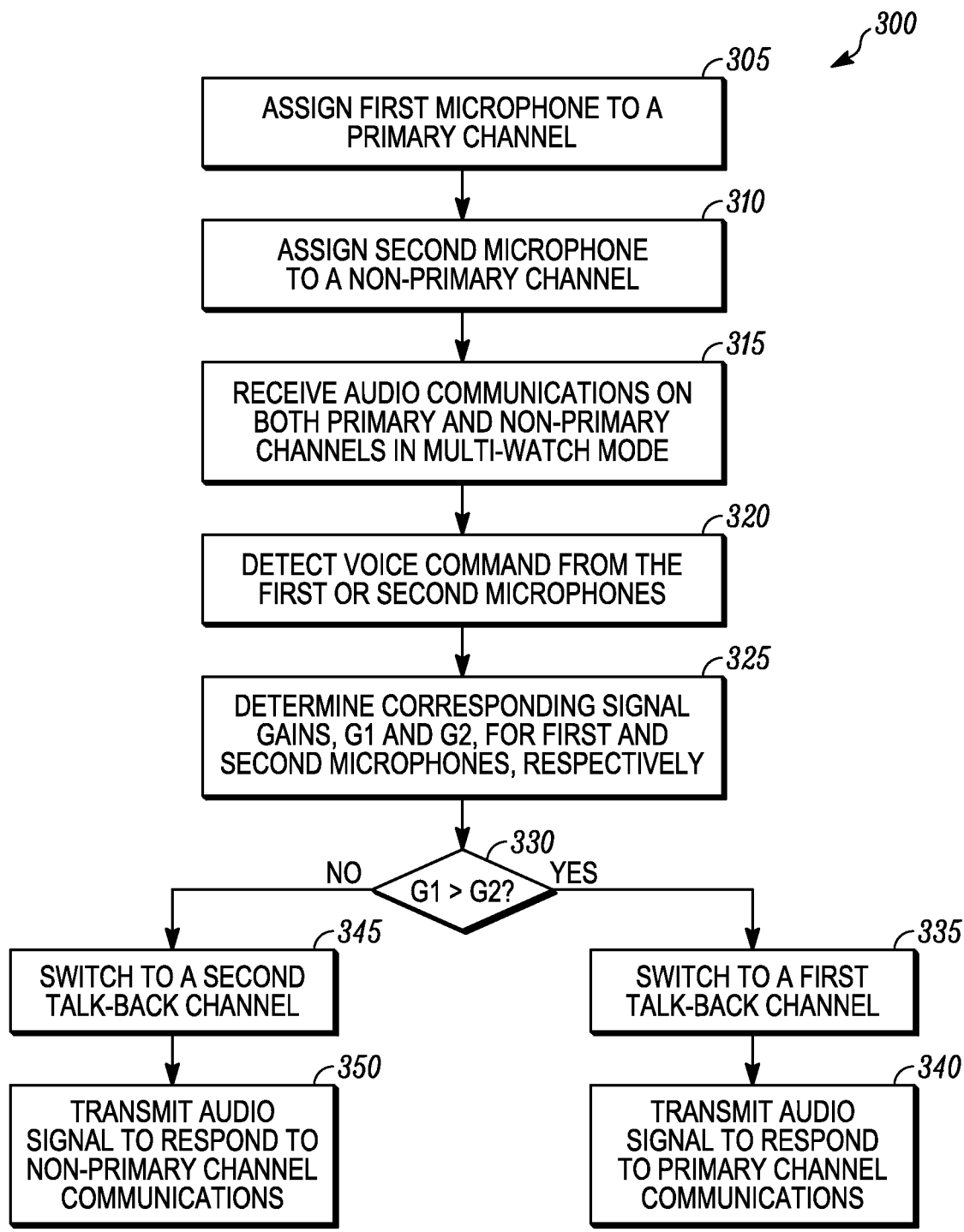
FIG. 3 is a flowchart of a method for automatically switching to a channel for transmission on a portable radio in accordance with some embodiments.

FIG. 3 is a flowchart of a method 300 for automatically switching to a channel for transmission on the portable radio 100 of FIG. 1 in accordance with some embodiments. The method 300 begins at block 305, where the first microphone 120 is assigned to respond to communications received on the primary channel, and at block 310, the second microphone 125 is assigned to respond to communications received on the non-primary channel. In accordance with some embodiments, the assignment of the first and second microphones 120, 125 to the primary and secondary channels respectively, is pre-configured in the portable radio 100, and further the information is stored in the memory 135. In one embodiment, the portable radio 100 configures the assignment of the first and second microphones 120, 125 based on an input from the user, and stores the assignment information in the memory 135. At block 315, when the portable radio 100 operates in a multi-watch mode, for example a dual-watch mode, in which the portable radio 100 receives independent audio communications simultaneously on both the primary and non-primary channels. At block 320, the portable radio 100 detects voice command at the first or second microphones 120, 125. In one embodiment, the processor 140 in the portable radio 100 activates the first and second microphones 120, 125 to detect and receive acoustic signals, for example, voice command input from the user when it detects a press operation on the PTT interface 130. As used herein, the term 'press operation' represents a pre-defined action or input from the user in which a switch or button associated with the push-to-talk operation is pressed and held as the user is speaking into the first or second microphones 120, 125 to provide voice command to the portable radio 100. Even though the user may have selected only one of the first or second microphones 120, 125 to provide his voice commands, it is possible that both the first and second microphones 120, 125 capture the acoustic signals corresponding to the voice commands. In accordance with the embodiments, the portable radio 100 is therefore configured to identify the specific one of the first or second microphones 120, 125 that the user has selected to provide his voice commands in order to select one of the primary or non-primary channels for transmission response.

In accordance with the embodiments, the processor 140 of the portable radio 100 executes an algorithm to determine whether the user is speaking into the first or second microphones 120, 125. In one embodiment, the portable radio 100 determines whether the user is speaking into the first or second microphones 120, 125 based on the audio signal gain computed for the respective microphones. Referring to block 325, the portable radio 100 determines the audio signal gains $G1$, $G2$ corresponding to the voice command detected at the first and second microphones 120, 125, respectively. At block 330, the portable radio 100 determines which of the first and second microphones 120, 125 has a larger audio signal gain corresponding to the detected voice command. In one embodiment, the portable radio 100 in particular determines whether the audio signal gain, $G1$ is larger than the audio signal gain, $G2$. When the audio signal gain, $G1$ for the first microphone 120 is larger than the audio signal gain, $G2$ for the second microphone 125, the portable radio 100, at block 335, switches to a first talk-back channel for transmission. At block 340, the portable radio 100 generates audio signal corresponding to the detected voice command and transmits the audio signal on the first talk-back channel to respond to communications received on the primary channel. Returning to block 330, when the portable radio 100 determines that audio signal gain, $G1$ for the first microphone 120 is smaller than the audio signal gain, $G2$ for the second microphone 125, the portable radio 100, at block 345, switches to a second talk-back channel for transmission. Next, at block 350, the portable radio 100 generates audio signal corresponding to the detected voice command and transmits audio signal on the second talk-back channel to respond to communications received on the non-primary channel.

Figure 4:
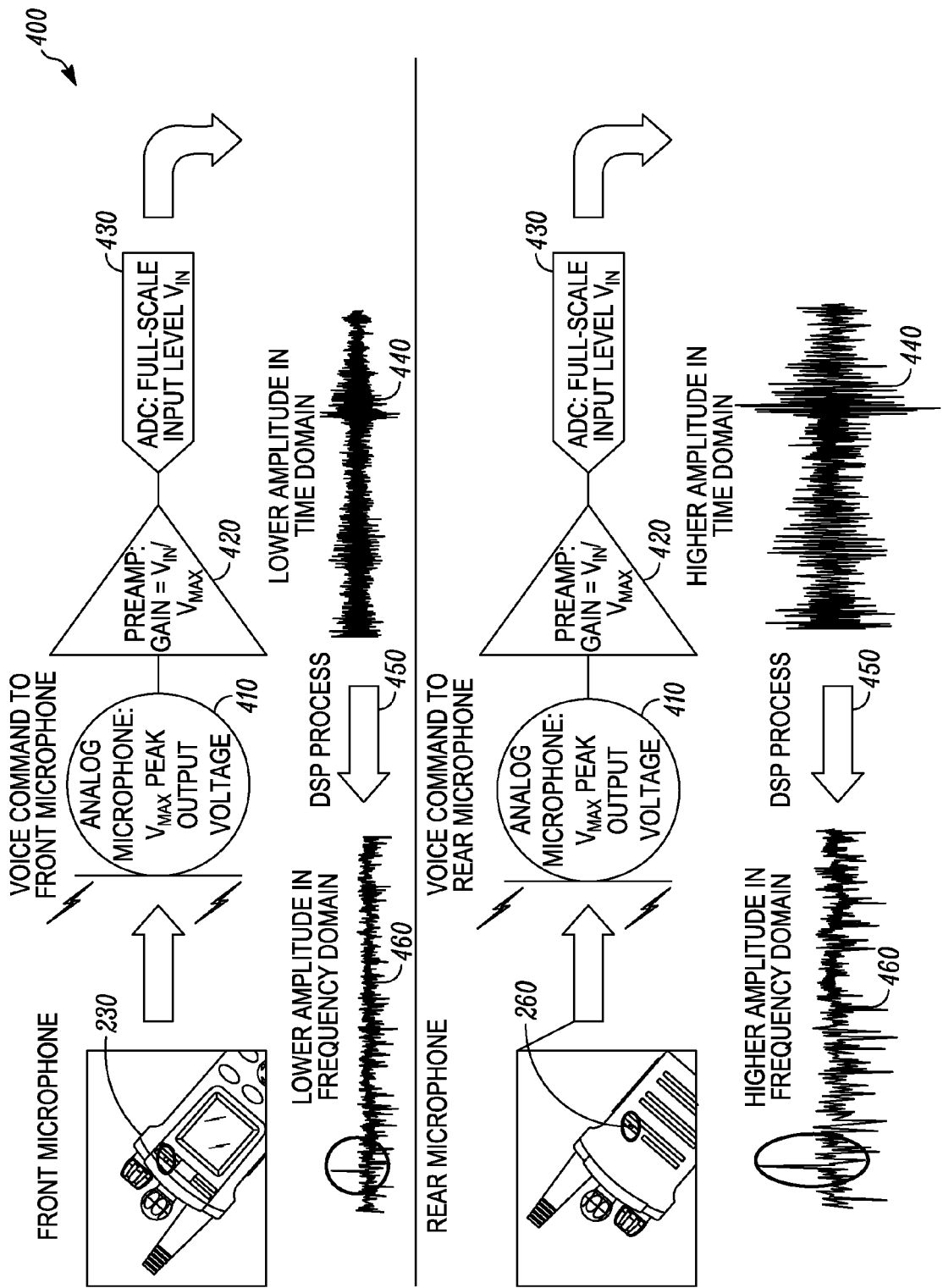
FIG. 4 illustrates a schematic of an audio signal gain comparison process at a portable radio in accordance with some embodiments.

FIG. 4 illustrates a schematic 400 of an audio signal gain comparison process at the portable radio 100 of FIG. 1 in accordance with some embodiments. When the user intends to respond to audio communications received on the primary or non-primary channels, the user speaks into a specific one of the first and second microphones 120, 125 located on the portable radio 100 to provide voice commands. As the user speaks, both the first microphone 120 (for example, front microphone 230 as shown in FIG. 2) and second microphone 125 (for example, rear microphone 260 as shown in FIG. 2) captures the acoustic signals in analog form corresponding to the voice commands. The processor 140 of the portable radio 100, as described with reference to FIG. 2, applies digital signal processing to the captured acoustic signals to determine corresponding audio signal gains at both the front and rear microphones 230, 260. Based on the comparison of the audio signal gains at both the front and rear microphones 230, 260, the processor 140 can identify the specific one of the front or rear microphones 230, 260 that the user is speaking into and further selectively switch to a first or second talk-back channels for responding to the audio communication received on the primary or non-primary channels. In accordance with the embodiments, each of the front and rear microphones 230, 260 is associated with a preamplifier operatively coupled thereto for providing amplification or gain for the analog voice commands captured by the respective microphones. Further, the front and rear microphones 230, 260 may comprise analog-to-digital converters (ADC) and other components operatively thereto for performing digital signal processing. In accordance with the embodiments, the preamplifier and ADCs are both internal to the front and rear microphones 230, 260, or within the associated circuitry to which the front and rear microphones 230, 260 is connected.

Referring to the schematic 400, as the front and rear microphones 230, 260 capture the acoustic signals corresponding to the voice command of the user, the processor 140 computes a peak output voltage 410, $V_{MAX}$ corresponding to the acoustic signals captured at the front and rear microphones 230, 260. The processor 140 further calculates the gains 420 provided by the preamplifier for the acoustic signals respectively captured at the front and rear microphones 230, 260. In one embodiment, the gain 420 is the ratio of the input voltage ($V_{IN}$, corresponding to the captured acoustic signals) to the peak output voltage i.e. $V_{IN}/V_{MAX}$. The ADC converts the analog signal (i.e. full-scale value of the input voltage, $V_{IN}$) corresponding to the captured acoustic signals into digitized form 430. When the digitized form of the acoustic signals captured at the front and rear microphones 230, 260 are mapped in the time domain, it indicates the varying amplitude of the acoustic signals in the time domain. For example, as shown in FIG. 4, a comparison of graphs 440 indicates that the amplitude of the acoustic signals corresponding to the rear microphone 260 is generally higher than the front microphone 230. When the digitized form of the acoustic signals captured at the front and rear microphones 230, 260 are mapped in the frequency domain after digital signal processing 450, it indicates the varying amplitude of the acoustic signals in the frequency domain. For example, a comparison of the graphs 460 corresponding to both front and rear microphones 230, 260 indicates that the amplitude in the frequency domain for the acoustic signal captured at the rear microphone 260 is higher than the amplitude in the frequency domain for the acoustic signal captured in the front microphone 230. The higher amplitude in the frequency and time domains for the acoustic signals captured at the rear microphone 260 represents that the audio signal gain at the rear microphone 260 is larger than the audio signal gain at the front microphone 230. This indicates that the user has been speaking directly towards the rear microphone 260 located on the rear surface 250 of the portable radio 100. Alternatively, if the comparison of graphs 460 shows that the amplitude for the acoustic signals captured at the front microphone 230 is higher than the amplitude at the rear microphone 260, then this higher amplitude at the front microphone 230 represents that the audio signal gain at the front microphone 230 is larger. This indicates that the user has been speaking directly towards the front microphone 230 located on the front surface 220 of the portable radio 100.

Figure 5:
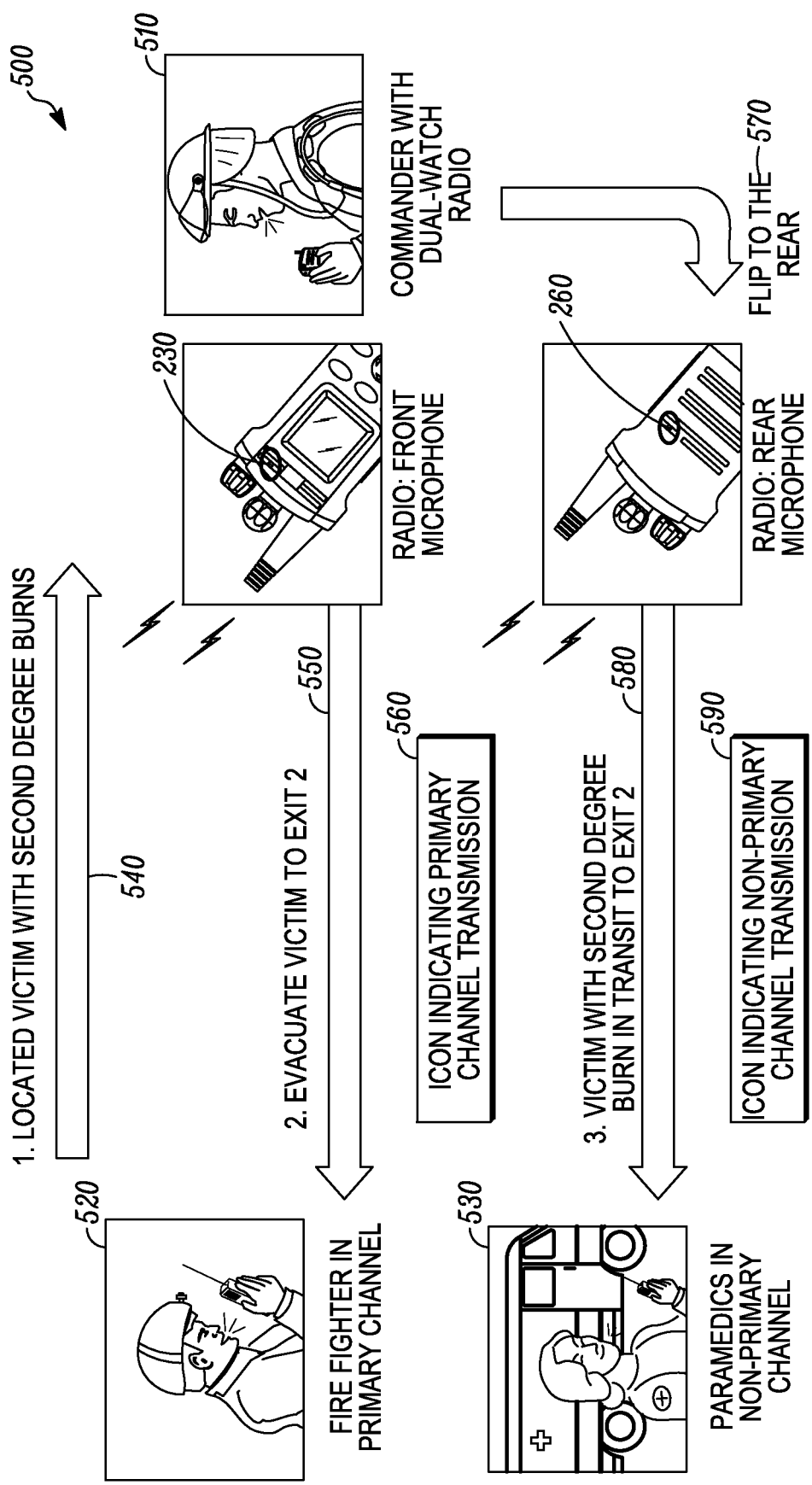
FIG. 5 illustrates a communication scenario involving a potential critical situation in which the method for automatically switching to a channel for transmission on a portable radio can be advantageously applied.

FIG. 5 illustrates a communication scenario 500 involving a potential critical situation in which the method 300 for automatically switching to a channel for transmission on the portable radio 100 of FIG. 1 can be advantageously applied. As shown in FIG. 5, an incident commander 510 uses a dual-watch radio, for example portable radio 100, to receive call from firefighters 520 on a primary channel and paramedics 530 on a non-primary channel. When both the primary and non-primary channels are active at the time of operation, the incident commander 510 may receive audio communications simultaneously from both firefighters 520 and paramedics 530. Conventionally, when a press operation at the PTT interface 130 is detected, the transmitter 110 in the portable radio 100 is configured, by default, to switch to a talk-back channel (i.e. first talk-back channel) for transmission to respond to audio communications received on the primary channel. Embodiments of the present disclosure overrides this default configuration of the transmitter 110 by determining which of the first or second microphones 120, 125 that the user is speaking into, and based on this determination, the transmitter 110 is configured to switch to one of the first or second talk-back channels for transmission to respond to audio communication received on the primary or non-primary channels. For example, when the user speaks towards a front microphone 230 (see FIG. 2), which is automatically identified by the portable radio 100 based on the associated larger audio signal gain, the transmitter 110 is configured to switch to the first talk-back channel to respond to audio communications received on the primary channel. Alternatively, when the user speaks towards a rear microphone 260 (see FIG. 2), which is automatically identified by the portable radio 100 based on the associated larger audio signal gain, the transmitter 110 is configured to automatically switch to the second talk-back channel for transmission to respond to audio communications received on the non-primary channel.

For example, referring to FIG. 5, let's assume that the incident commander 510 just received audio communication 540 on the primary channel that the firefighters 520 have located a victim with second degree burns. In accordance with embodiments of the present disclosure, the incident commander 510 can respond to this audio communication 540 from the firefighters 520 by simply directing his speech towards the front microphone 230 located on the front surface 220 of the portable radio 100. In this case, the portable radio 100 does not need any additional input from the user regarding the channel (for example, via a channel control knob) that the user intends to respond. In this example, the incident commander 510 responds with audio communications 550 by speaking towards the front microphone 230 to request that the victim be evacuated to a particular exit. Further, in accordance with some embodiments, the alert indication unit 145 is activated, for example, to visually display a graphical user interface (GUI) icon to indicate 560 that the transmission corresponds to the audio communications received on the primary channel. Further, the incident commander 610 may want to share the same information to the paramedics 530. In this case, the incident commander 510 can simply flip 570 the portable radio 100 to the rear surface 250 and speak towards the rear microphone 260 to transmit audio communications 580 to respond to the paramedics 530 on the non-primary channel. This action of the user to speak at the rear microphone 260 to respond to paramedics 530 on the non-primary channel eliminates the need for channel adjustment/selection, via a channel control knob, that was required from incident commanders responding on conventional radios. The alert indication unit 145 is also activated to indicate 590 to the user that the transmission corresponds to the audio communications received on the non-primary channel. This indication enables the user to verify that the portable radio 100 has accurately detected user's intention to respond to audio communications received on a specific one of the primary or non-primary channels and to take corrective actions in case of an error in the automatic identification of the microphone by the portable radio 100. Accordingly, as illustrated in FIG. 5, the incident commander 510 is able to respond to audio communications between primary and non-primary channels without the requirement of providing additional input regarding the primary or non-primary channel that the user wishes to respond.

Figure 6:
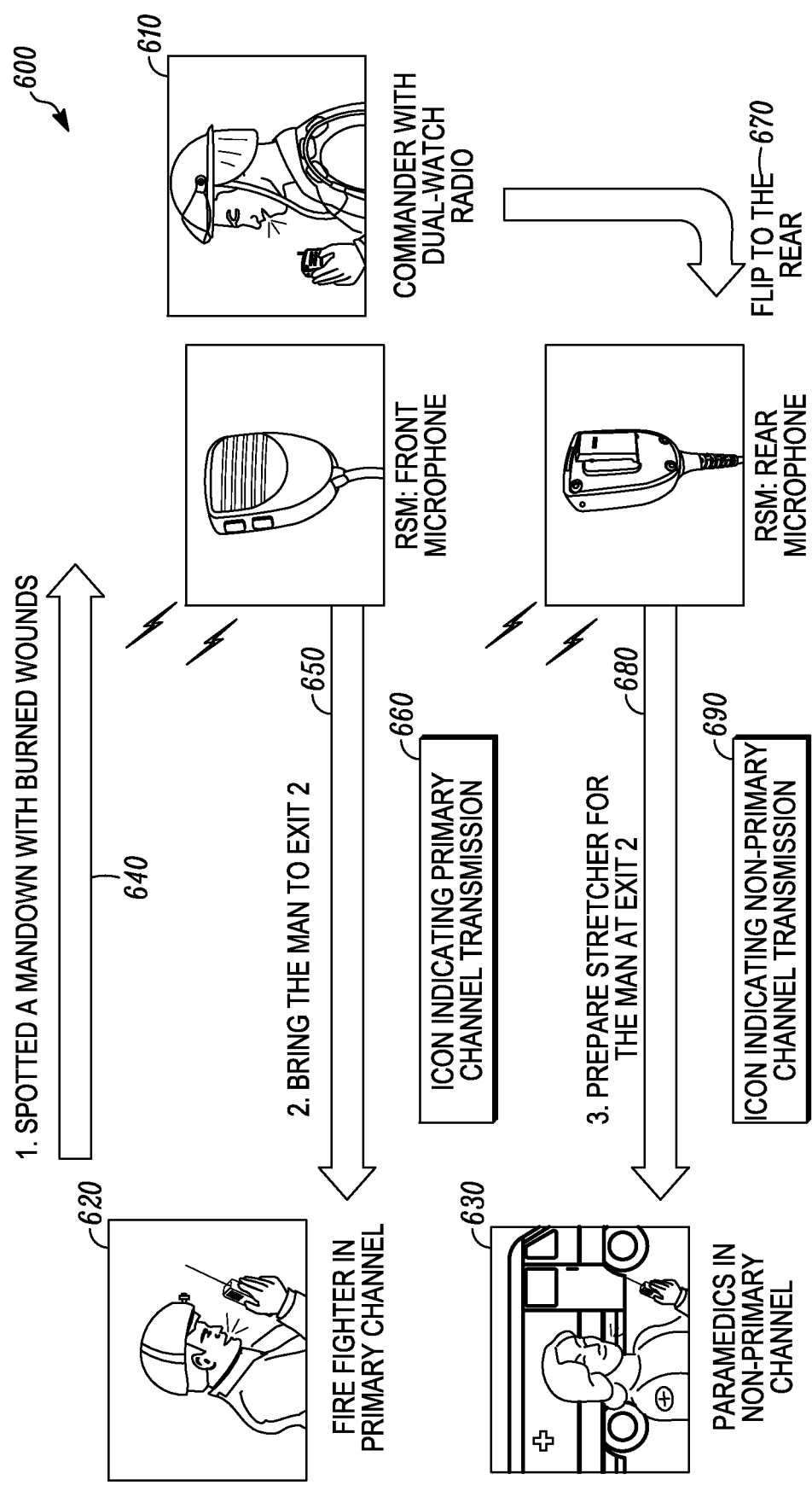
FIG. 6 illustrates another communication scenario involving a potential critical situation in which the method for automatically switching to a channel for transmission on a portable radio can be advantageously applied.

FIG. 6 illustrates a communication scenario 600 involving a potential critical situation in which the method 300 for automatically switching to a channel for transmission on the portable radio 100 of FIG. 1 can be advantageously applied. As shown in FIG. 6, an incident commander 610 uses RSM accessory that is coupled to a dual-watch radio, for example portable radio 100, to receive call from firefighters 620 on a primary channel and paramedics 630 on a non-primary channel. In accordance with embodiments of the present disclosure, the RSM accessory includes the first and second microphones 120, 125 i.e. a front microphone that is located on a front surface and a rear microphone that is located on a rear surface. When both the primary and non-primary channels are active at the time of operation, the incident commander 610 may receive audio communications simultaneously from both firefighters 620 and paramedics 630. Conventionally, when a press operation at the PTT interface 130 is detected, the transmitter 110 in the portable radio 100 is configured, by default, to switch to a talk-back channel (i.e. first talk-back channel) for transmission to respond to audio communications received on the primary channel. Embodiments of the present disclosure overrides this default configuration of the transmitter 110 by determining which of the first or second microphones 120, 125 that the user is speaking into, and based on this determination, the transmitter 110 is configured to switch to a first or second talk-back channel for transmission to respond to audio communication received on the primary or non-primary channels. For example, when the user speaks towards a front microphone on the RSM accessory, which is automatically identified by the portable radio 100 based on the associated larger audio signal gain, the transmitter 110 is configured to switch to the first talk-back channel to respond to audio communications received on the primary channels. Alternatively, when the user speaks towards a rear microphone on the RSM accessory, which is automatically identified by the portable radio 100 based on the associated larger audio signal gain, the transmitter 110 is configured to automatically switch to the second talk-back channel for transmission to respond to audio communications received on the non-primary channel.

For example, referring to FIG. 6, let's assume that the incident commander 610 just received audio communication 640 on the primary channel that the firefighters 520 have spotted a man down with burned wounds. In accordance with embodiments of the present disclosure, the incident commander 610 can respond to this audio communication from the firefighters 620 by simply directing his speech towards the front microphone located on the front surface of the RSM accessory. In this case, the portable radio 100 does not need any input from the user regarding the channel (for example, via a channel control knob) that the user intends to respond. The incident commander 610 responds with audio communication 650 by speaking towards the front microphone of the RSM accessory to request that the man be brought to a particular exit. Further, in accordance with some embodiments, the alert indication unit 145 is activated, for example, to visually display an icon to indicate 660 that the transmission corresponds to the audio communications received on the primary channel. Further, the incident commander 610 may want to share this response sent to the firefighters 620 with the paramedics 630 and to request the paramedics 630 to prepare a stretcher for the man in transit to the particular exit. In this case, the incident commander 610 can simply flip 670 to the rear surface of the RSM accessory and speak towards the rear microphone to transmit audio communications 580 to respond to the paramedics 530 on the non-primary channel. This action of the user to speak at the rear microphone to respond to the paramedics 530 on the non-primary channel eliminates the need for channel adjustment/selection, which was required from incident commanders responding on conventional radios. The alert indication unit 145 is also activated to indicate 690 to the user that the transmission corresponds to the audio communications received on the non-primary channel. This indication enables the user to verify that the portable radio 100 has accurately detected user's intention to respond to audio communications received on a particular one of the primary or non-primary channels and to take corrective actions in case of an error in the automatic identification of the microphone by the portable radio 100. Accordingly, as illustrated in FIG. 6, the incident commander 610 is able to respond to audio communications between primary and non-primary channels without the requirement of providing additional input regarding the primary or non-primary channel that the user wishes to respond.

Figure 7:
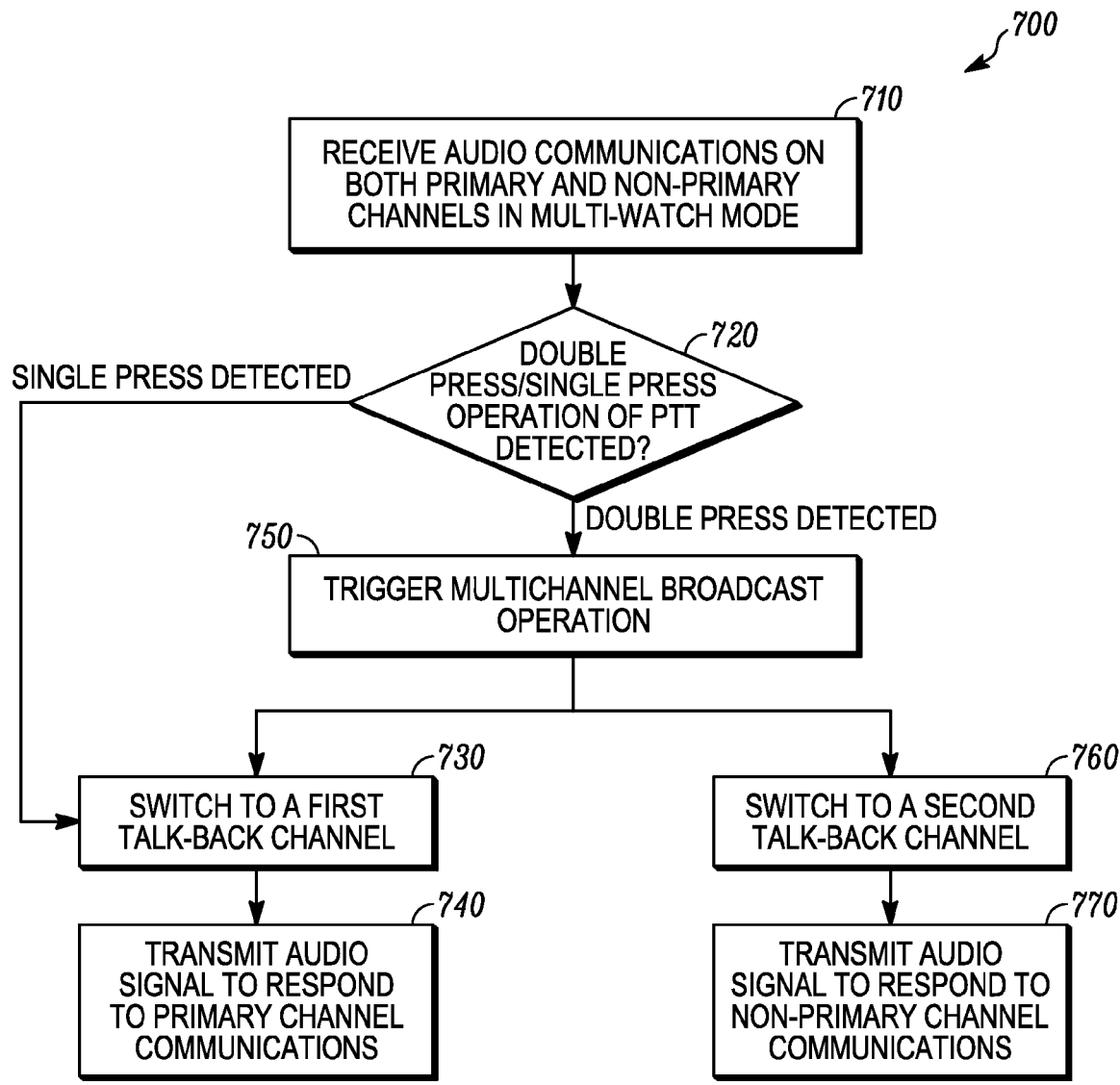
FIG. 7 illustrates a flowchart of a method for automatically switching to channels for transmission to perform multichannel broadcast operation on a portable radio in accordance with some embodiments.

FIG. 7 illustrates a flowchart of a method 700 for automatically switching to channels for transmission to perform multichannel broadcast operation on the portable radio 100 of FIG. 1 in accordance with some embodiments. At block 710, the portable radio 100 operates in a multi-watch mode to receive independent audio communications simultaneously on both the primary and non-primary channels. Next, at block 720, the portable radio 100 determines whether a single press operation or double press operation of the PTT interface 130 is detected. The portable radio 100 detects a 'single press operation' when a switch or button of the PTT interface 130 is pressed/tapped once and held as the user speaks into the first or second microphones 120, 125 to provide voice commands. When the single press operation of the PTT interface 130 is detected, the portable radio 100, by default, switches to a first talk-back channel corresponding to the primary channel at block 730. Next, at block 740, the portable radio 100 transmits audio signal on the first talk-back channel corresponding to the voice commands detected at the first or second microphones 120, 125 to respond to audio communications received on the primary channel.

Returning to block 720, the portable radio 100 detects a 'double press operation' (see FIG. 9A) of the PTT interface 130 when a switch or button of the PTT interface 130 is pressed twice with a predetermined timing between the presses and further held as the user speaks into the first or second microphones 120, 125 to provide voice commands. When the double press operation of the PTT interface 130 is detected, the portable radio 100 triggers a multichannel broadcast operation at block 750. In accordance with embodiments of the present disclosure, the multichannel broadcast operation indicates a transmission mode in which the portable radio 100 operating in multi-watch mode automatically switches to multiple transmission channels (e.g. first and second talk-back channels) in order to respond to communications received on the primary and non-primary channels. Next, at blocks 730 and 760, the portable radio 100 concurrently switches to the first and second talk-back channels corresponding to the primary and non-primary channels, respectively. At blocks 740 and 770, the portable radio 100 simultaneously transmits audio signals corresponding to the voice commands detected at the first or second microphones 120, 125 on the first and second talk-back channels to respond to communications received on the primary and non-primary channels respectively.

Figure 8:
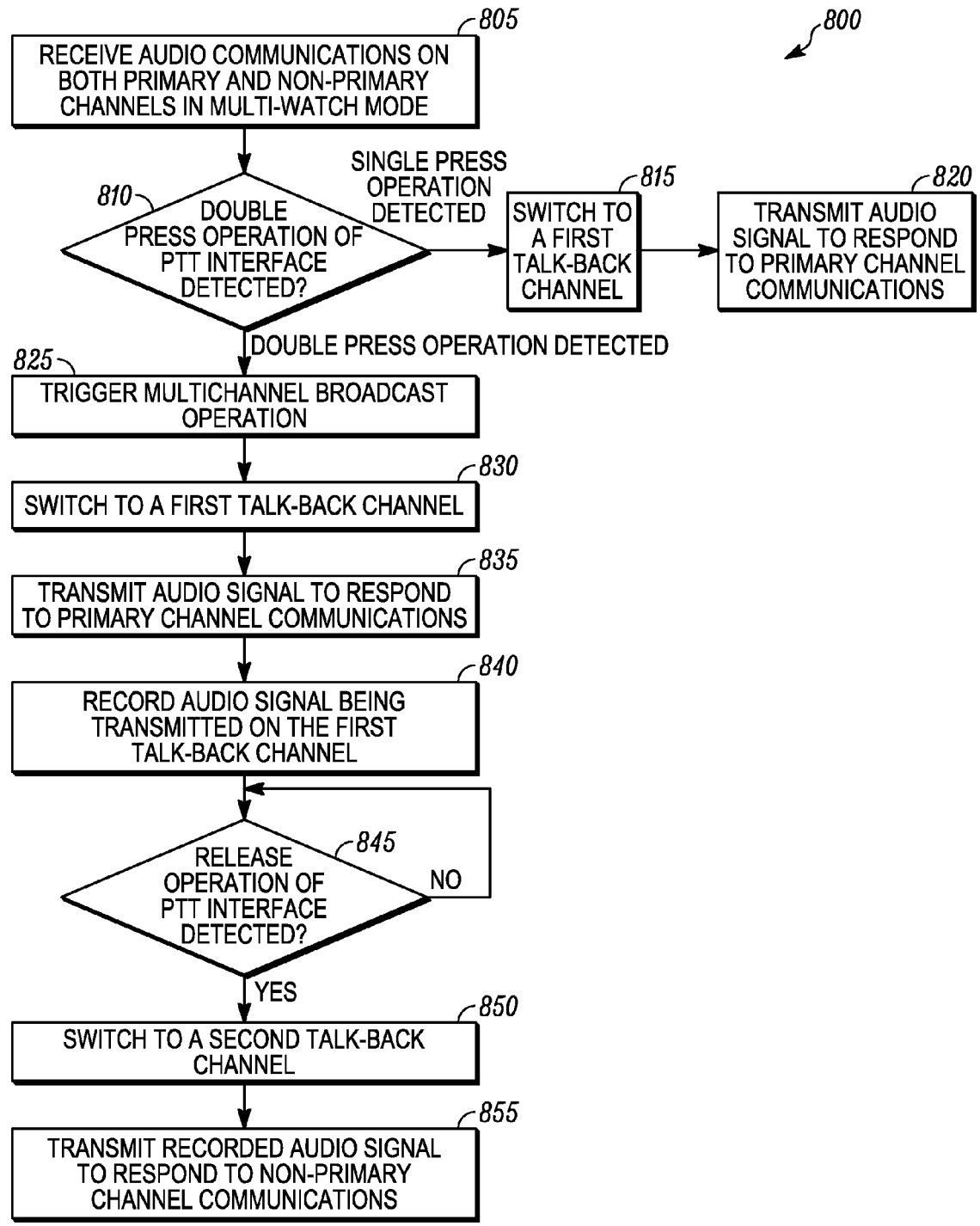
FIG. 8 illustrates a flowchart of a method for automatically switching to channels for transmission to perform multichannel broadcast operation on a portable radio in accordance with some embodiments.

FIG. 8 illustrates a flowchart of a method 800 for automatically switching to channels for transmission to perform multichannel broadcast operation on the portable radio 100 of FIG. 1 in accordance with some embodiments. At block 805, the portable radio 100 operates in multi-watch mode to receive independent audio communications simultaneously on both the primary and non-primary channels. Next, at block 810, the portable radio 100 determines whether a single press operation or double press operation of the PTT interface 130 is detected. The portable radio 100 detects a 'single press operation' when a switch or button of the PTT interface 130 is pressed/tapped once and held as the user speaks into the first or second microphones 120, 125 to provide voice commands. When the single press operation of the PTT interface 130 is detected, the portable radio 100, by default, switches to a first talk-back channel corresponding to the primary channel at block 815. Next, at block 820, the portable radio 100 transmits audio signal on the first talk-back channel corresponding to the voice commands detected at the first or second microphones 120, 125 to respond to audio communications received on the primary channel.

Returning to block 810, the portable radio 100 detects a 'double press operation' (see FIG. 9A) when a switch or button of the PTT interface 130 is pressed/tapped twice with a predetermined timing between the presses and further held as the user speaks into the first or second microphones 120, 125 to provide voice commands. When the double press operation of the PTT interface 130 is detected, the portable radio 100 triggers a multichannel broadcast operation at block 825. In accordance with embodiments of the present disclosure, the multichannel broadcast operation indicates a transmission mode in which the portable radio 100 operating in multi-watch mode automatically switches to multiple transmission channels (e.g. first and second talk-back channels) in order to respond to communications received on the primary and non-primary channels. Next, at block 830, the portable radio 100 switches to a first talk-back channel corresponding to the primary channel, and at block 835, the portable radio 100 transmits audio signal corresponding to the voice commands detected at the first or second microphones 120, 125 on the first talk-back channel to respond to audio communications received on the primary channel. At block 840, the portable radio 100 records the audio signal that is being transmitted on the first talk-back channel. Next, at block 845, when the portable radio 100 detects a release operation of the PTT interface 130 i.e. when a switch or button of the PTT interface 130 is released, the portable radio 100 automatically switches to a second talk-back channel corresponding to the non-primary channel as shown at block 850. At block 855, the portable radio 100 transmits the audio signal recorded at block 840 on the second talk-back channel to respond to audio communications received on the non-primary channel.

In an alternative embodiment (not shown), when the portable radio 100 detects a double press operation of the PTT interface 130 at block 810, the portable radio 100, instead of switching by default to the first talk-back channel, determines whether the audio signal gain at the second microphone 125 is larger than the audio signal gain at the first microphone 120. If the audio signal gain at the second microphone 125 is larger, then the portable radio 100, switches to a second talk-back channel and responds to audio communications received on the non-primary channel. In this embodiment, the portable radio 100 further records the audio signal being transmitted on the second talk-back channel. When a release operation of the PTT interface 130 is detected, the portable radio 100 automatically switches to the first talk-back channel and transmits the recorded audio signal on the first talk-back channel to respond to audio communications received on the primary channel.

FIGS. 9A and 9B illustrate a double press operation of a PTT interface 130 at the portable radio 100 of FIG. 1 in accordance with embodiments of the present disclosures, when a double press operation of the PTT interface 130 is detected, the portable radio 100 triggers the multichannel broadcast operation. The double press operation is detected when a switch or button of the PTT interface 130 is pressed twice with a predetermined timing between the two presses and held as the user speaks into a microphone to provide voice command. FIGS. 9A and 9B show graphs 900, 950, respectively depicting a proper double press operation and improper double press operation of the PTT interface 130. In the graphs 900, 950, horizontal axis represents the time and vertical axis represents the state of the PTT interface 130. The state of the PTT interface 130 may include a 'pressed' state in which a switch or button of the PTT interface 130 is pressed and held in the same position, and a 'released' state in which the switch or button is released to its original position. In accordance with embodiments, a double press operation of the PTT interface 130 is proper or complete when the PTT interface 130 transitions from its original position of the 'released' state' to the 'pressed state' (at time '$t_1$') and again from the 'pressed' state to the 'released' state (at time '$t_2$'), and further again from the 'released' state' to the 'pressed state' (at time '$t_3$') within a predetermined timing threshold since the initial transition to the 'pressed state'. In other words, a double press operation of the PTT interface 130 is proper or complete when the PTT interface 130 is pressed twice with a predetermined timing between the two presses. As shown in FIGS. 9A and 9B, '$\Delta T_1$' indicates the time taken for transition from a 'pressed state' (resulting from a first press of the PTT interface 130) to a 'released' state. '$\Delta T_1$' can be calculated as a function of '$t_2$'–'$t_1$'. '$\Delta T_2$' indicates the time taken for transition from the 'released state' to a 'pressed state' (resulting from a second press of the PTT interface 130). '$\Delta T_2$' can be calculated as a function of '$t_3$'–'$t_2$'. 'T' indicates the predetermined timing threshold.

In FIG. 9A, it is shown that the total time ('$\Delta t_1$'+'$\Delta t_2$') between the first press and second press is less than the predetermined timing threshold, 'T'. In this case, the double press operation of the PTT interface 130 is performed with a predetermined timing between the two presses. Therefore, the double press operation shown in FIG. 9A is deemed proper, thereby triggering the multichannel broadcast operation. In one embodiment, as described with reference to FIG. 7, the multichannel broadcast operation enables concurrent transmission on both the first and second talk-back channels to respond to audio communications received on the primary and non-primary channels. The multichannel broadcast operation, in this embodiment, ends when the PTT interface 130 again transitions from the 'pressed' state to the 'released' state (at time '$t_4$'). In another embodiment, as described with reference to FIG. 8, when the portable radio 100 does not support concurrent transmission on multiple channels, the portable radio 100 initially transmits on the first talk-back channel and concurrently records the transmission for the entire duration of time, starting at time '$t_3$' until the PTT interface 130 transitions from the 'pressed' state to the 'released' state at time '$t_4$'. When the transition to the 'released' state at time '$t_4$' is detected, the portable radio 100 automatically switches to the second talk-back channel and transmits the signals previously recorded to respond to audio communications received on the non-primary channel.

Referring to FIG. 9B, it is shown that the total time CAW+ '$\Delta t_2$') between the first press and second press is more than the predetermined timing threshold, 'T'. In this case, the double press operation of the PTT interface 130 is not performed with a predetermined timing between the two presses. The double press operation shown in FIG. 9B is deemed improper or incomplete, and therefore this improper double press operation will not trigger a multichannel broadcast operation. In one embodiment, when a second press operation i.e. a transition of the PTT interface 130 from 'released state' to 'pressed state' is detected at time '$t_3$', the portable radio 100 considers this incomplete double press operation as equivalent to a single press operation and therefore performs the default transmission operation. During the default transmission operation, as described with reference to FIG. 3, the portable radio 100 switches either to a first talk-back channel or second talk-back channel to respond to primary or non-primary channels depending on the specific one of the first or second microphones 120, 125 that the user has selected to respond. Subsequently, when the PTT interface 130 transitions from the 'pressed' to the 'released' state at time '$t_4$', the portable radio 100 switches back to multi-watch mode to receive audio communications simultaneously on the primary and non-primary channels.

Figure 10:
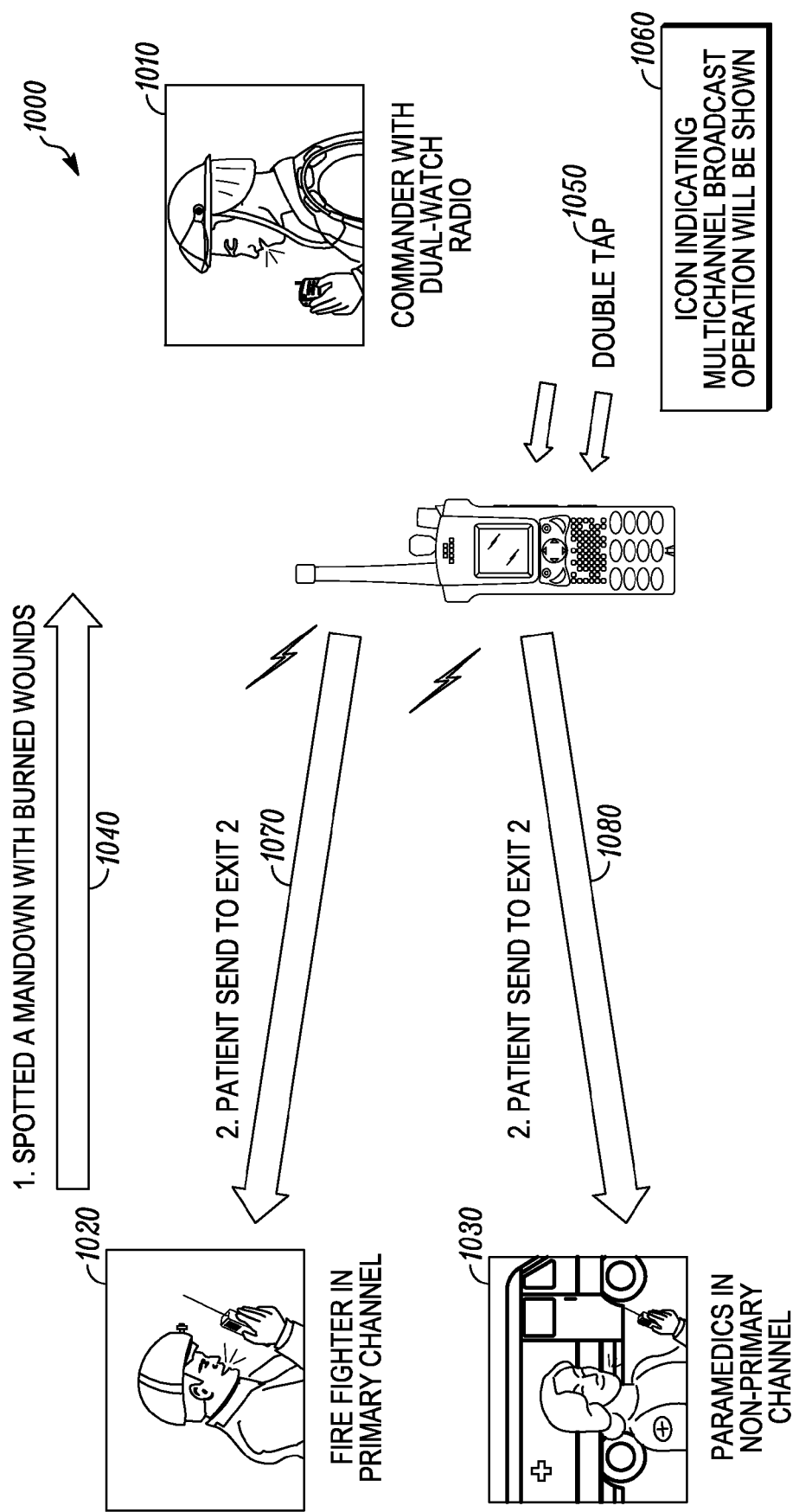
FIG. 10 illustrates a communication scenario involving a potential critical situation in which the method for automatically switching to channels for transmission to perform multichannel broadcast operation on a portable radio can be advantageously applied.

FIG. 10 illustrates a communication scenario 1000 involving a potential critical situation in which the methods 700, 800 for automatically switching to channels for transmission to perform multichannel broadcast operation on the portable radio 100 of FIG. 1 can be advantageously applied. As shown in FIG. 10, an incident commander 1010 uses a dual-watch radio, for example portable radio 100, to receive call from firefighters 1020 on a primary channel and paramedics 1030 on a non-primary channel. When both the primary and non-primary channels are active at the time of operation, the incident commander 1010 may receive audio communications simultaneously from both firefighters 1020 and paramedics 1030. Conventionally, when a press operation at the PTT interface 130 is detected, the transmitter 110 in the portable radio 100 is configured, by default, to switch to a talk-back channel (i.e. first talk-back channel) for transmission to respond to audio communications received on the primary channel. Embodiments of the present disclosure overrides this default configuration of the transmitter 110 by determining whether a double press operation at the PTT interface 130 is detected, and based on this determination, the transmitter 110 is configured to perform a multichannel broadcast operation by switching to both first and second talk-back channels for transmission to respond to audio communication received on the primary and non-primary channels.

For example, referring to FIG. 10, let's assume that the incident commander 1010 just received audio communication 1040 on the primary channel that the firefighters 1020 have spotted a man down with burned wounds. In accordance with embodiments of the present disclosure, the incident commander 1010 can respond to this audio communication 1040 from the firefighters 1020 and also further share this response to the paramedics 1030 by simply performing a double press operation (shown as double tap operation 1050 in FIG. 10) at the PTT interface 130. In this case, the portable radio 100 does not need any additional input from the user regarding the channel that the user intends to respond. Further, when a double press operation at the PTT interface 130 is detected, the alert indication unit 145 is activated, for example, to visually display an icon to indicate 1060 the multichannel broadcast operation. In the example shown in FIG. 10, the incident commander 1010 by double tapping the PTT interface 130 transmits audio communication 1070 requesting the firefighters 1020 to send the patient to a particular exit, and the same information is also transmitted to the paramedics 1030 via the audio communication 1080. In one embodiment, as described with reference to FIG. 7, in portable radios supporting concurrent transmission on both first and second talk-channels, the incident commander 1010 by double tapping the PTT interface 130 can transmit audio communications 1070, 1080 simultaneously on both the first and second talk-back channels for responding to the firefighters 1020 on the primary channel and paramedics 1030 on the non-primary channel, respectively. In another embodiment, as described with reference to FIG. 8, when the incident commander 1010 performs a double press operation at the PTT interface 130, the portable radio 100 initially transmits audio communications 1070 on the first talk-back channel to respond to the firefighters 1020 on the primary channel, and concurrently records the transmission of the audio communications, for example, in a buffer in the memory 135. Subsequently, when the incident commander 1010 performs a release operation at the PTT interface 130, the portable radio 100 transmits audio communications 1080, which is the recorded copy of the audio communications 1070, on the second talk-back channel to respond to the paramedics 1030 on the non-primary channel. Accordingly, as illustrated in FIG. 10, the incident commander 1010 is able to respond to audio communications between primary and non-primary channels without the requirement of providing additional input regarding the primary or non-primary channels that the user wishes to respond.

Embodiments of the present disclosure described above with reference to FIGS. 1-10 can be advantageously employed in portable radios supporting multi-watch mode of operation to automatically switch to a primary or non-primary channels for transmission. Conventional multi-watch portable radios, by default, allow push-to-talk calls only over a primary channel, and it requires an incident commander to adjust the channel control knob located on the top of the portable radio 100 to select a non-primary channel in order to initiate PTT calls over the non-primary channel. If the incident commander needs to switch back to the PTT call over the primary channel, the incident commander is again required to visually look at the portable radio and manually toggle/activate the channel control knob to select the primary channel. Embodiments of the present disclosure however allow multi-watch portable radios to automatically switch between channels for transmission to respond to primary and non-primary channels based on the determination of audio signal gain associated with the plurality of microphones. Embodiments of the present disclosure allow incident commanders to pre-configure the assignment of the plurality of microphones located in the multi-watch portable radios for either responding to primary channel or non-primary channel. This automatic identification of channels for transmission based on the audio signal gain associated with the microphones eliminates the need for visual focus required from the user to interact with the multi-watch radio. In one embodiment, incident commanders can simply flip the portable radio between the two sides of the radio to select between the primary and non-primary channels for transmission. Embodiments of the present disclosure also allow incident commanders to double tap or press the PTT interface to trigger multichannel broadcast operation and concurrently transmit audio communications to emergency responders on both primary and non-primary channels. The use of multichannel broadcast operation eliminates the need for incident commanders to manually toggle the channel control knob to select a non-primary channel and repeat the same message previously sent to an emergency responder on the primary channel. In communication scenarios involving potential critical situation, the use of multichannel broadcast operation ensures that the incident commanders are able to send out critical messages to emergency responders communicating on both primary and non-primary channels. The transmission of same message to emergency responders communicating on both primary and non-primary channels also ensures that the incident commanders are not missing out any vital information, which is possible if incident commanders were to manually toggle the PTT interface and repeat the same message on different channels. Accordingly, embodiments described herein provide a multi-watch portable radio that allows a user to carry a single portable radio or a collaborative set of radio and microphone accessory to monitor communications simultaneously on more than one communication channel. This further eliminates the need for a user to carry two physical radios in public safety environments for responding to emergency responders on multiple communication channels.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for automatically switching to a channel for transmission on a portable radio, the method comprising:

assigning a first microphone of the portable radio to respond to communications received on a primary channel;

assigning a second microphone of the portable radio to respond to communications received on at least one non-primary channel;

receiving independent audio communications simultaneously on the primary channel and the at least one non-primary channel when the portable radio communication device is operating in a multi-watch mode;

in response to detecting a voice command received at the first or second microphones, determining a signal gain corresponding to the received voice command for both the first and second microphones;

switching to a first talk-back channel to respond to communications received on the primary channel when the signal gain for the first microphone is larger than the signal gain for the second microphone; and switching to a second talk-back channel to respond to communications received on the at least one non-primary channel when the signal gain for the second microphone is larger than the signal gain for the first microphone.

2. The method of claim 1, wherein the first and second microphones are located on different sides of the portable radio.

3. The method of claim 1, wherein switching to the first talk-back channel or the second talk-back channel is automatically triggered without an activation of a channel control knob located in the portable radio.

4. The method of claim 1, wherein the first talk-back channel is the primary channel and the second talk-back channel is the at least one non-primary channel.

5. The method of claim 1, further comprising:
providing an alert in the portable radio to indicate that the communications received on the primary channel is being responded to on the first talk-back channel when the signal gain for the first microphone is larger than the signal gain for the second microphone; and
providing an alert in the portable radio to indicate that the communications received on the at least one non-primary channel is being responded to on the second talk-back channel when the signal gain for the second microphone is larger than the signal gain for the first microphone.

6. The method of claim 1, further comprising:
detecting a double press operation of a push-to-talk interface with a predetermined timing between presses at the portable radio;
detecting voice command received at the first or second microphones; and
switching to the first talk-back channel to transmit an audio signal corresponding to the received voice command in response to communications received on the primary channel and concurrently switching to the second talk-back channel to transmit the audio signal in response to communications received on the at least one non-primary channel.

7. The method of claim 6, further comprising:
providing an alert in the portable radio to indicate that the audio signal is being transmitted on both the primary channel and the at least one non-primary channel.

8. The method of claim 1, further comprising:
detecting a double press operation of a push-to-talk interface with a predetermined timing between presses at the portable radio;
detecting a voice command received at the first or second microphones; and
switching to the first talk-back channel to transmit an audio signal corresponding to the received voice command in response to communications received on the primary channel and concurrently recording the audio signal being transmitted on the first talk-back channel; and
switching to the second talk-back channel to transmit the recorded audio signal in response to communications received on the at least one non-primary channel when a release operation of the push-to-talk interface is detected.

9. The method of claim 1, further comprising:
detecting a double press operation of a push-to-talk interface with a predetermined timing between the presses at the portable radio;
detecting a voice command at the first or second microphones and determining a signal gain corresponding to the voice command for both the first and second microphones;
when the signal gain for the first microphone is larger than the signal gain for the second microphone,
switching to the first talk-back channel to transmit an audio signal corresponding to the received voice command in response to communications received on the primary channel and concurrently recording the audio signal being transmitted on the first talk-back channel, and
switching to the second talk-back channel to transmit the recorded audio signal in response to communications received on the at least one non-primary channel when a release operation of the push-to-talk interface is detected; and
when the signal gain for the second microphone is larger than the signal gain for the first microphone,
switching to the second talk-back channel to transmit an audio signal corresponding to the received voice command in response to communications received on the at least one non-primary channel and concurrently recording the audio signal being transmitted on the second talk-back channel, and
switching to the first talk-back channel to transmit the recorded audio signal in response to communications received on the primary channel when a release operation of the push-to-talk interface is detected.

10. The method of claim 1, wherein the portable radio comprises one of a two-way communication radio and a remote speaker microphone (RSM) accessory coupled to the two-way communication radio, and further wherein the first and second microphones are located on different sides of the two-way communication radio or on different sides of the RSM accessory.

11. A portable radio comprising:
at least two microphones;
a multi-watch receiver configured to operate in multi-watch mode to receive independent audio communications simultaneously on a primary channel and at least one non-primary channel; and
a processor communicatively coupled to the at least two microphones and the multi-watch receiver, the processor:
assigns a first one of the at least two microphones to respond to communications received on the primary channel;
assigns a second one of the at least two microphones to respond to communications received on the at least one non-primary channel;
detects a voice command received at the first one or second one of the at least two microphones;
determines a signal gain corresponding to the received voice command for both the first one and second one of the at least two microphones;
switches to a first talk-back channel to respond to communications received on the primary channel when the signal gain for the first one of the at least two microphones is larger than the signal gain for the second one of the at least two microphones; and
switches to a second talk-back channel to respond to communications received on the at least one non-primary channel when the signal gain for the second one of the at least two microphones is larger than the signal gain for the first one of the at least two microphones.

12. The portable radio of claim 11, wherein the portable radio further comprises a housing, and further wherein the at least two microphones are located on different sides of the housing.

13. The portable radio of claim 11, wherein the processor automatically triggers the switching to the first talk-back channel or the second talk-back channel without an activation of a channel control knob located in the portable radio.

14. The portable radio of claim 11, wherein the first talk-back channel is the primary channel and the second talk-back channel is the at least one non-primary channel.

15. The portable radio of claim 11, further comprises an alert indication unit that provides an alert to indicate that:
the communications received on the primary channel is being responded to on the first talk-back channel when the signal gain for the first microphone is larger than the signal gain for the second microphone, or
the communications received on the at least one non-primary channel is being responded to on the second talk-back channel when the signal gain for the second microphone is larger than the signal gain for the first microphone.

16. The portable radio of claim 11, wherein the processor further:
detects a double press operation of a push-to-talk interface with a predetermined timing between presses at the portable radio;
detects a voice command received at the first or second microphones; and
switches to the first talk-back channel to transmit an audio signal corresponding to the received voice command in response to communications received on the primary channel and concurrently switches to the second talk-back channel to transmit the audio signal in response to communications received on the at least one non-primary channel.

17. The portable radio of claim 16, further comprises an alert indication unit that provides an alert to indicate that the audio signal is being transmitted on both the primary channel and the at least one non-primary channel.

18. The portable radio of claim 11, wherein the processor further:
detects a double press operation of a push-to-talk interface with a predetermined timing between presses at the portable radio;
detects a voice command received at the first or second microphones;
switches to the first talk-back channel to transmit an audio signal corresponding to the received voice command in response to communications received on the primary channel and concurrently records the audio signal being transmitted on the talk-back channel; and
switches to the second talk-back channel to transmit the recorded audio signal in response to communications received on the at least one non-primary channel when a release operation of the push-to-talk interface is detected.

19. The portable radio of claim 11, wherein the processor further:
detects a double press operation of a push-to-talk interface with a predetermined timing between the presses at the portable radio;
detects a voice command received at the first or second microphones and determines a signal gain corresponding to the received voice command for both the first and second microphones;
when the signal gain for the first microphone is larger than the signal gain for the second microphone,
switches to the first talk-back channel to transmit an audio signal corresponding to the received voice command in response to communications received on the primary channel and concurrently records the audio signal being transmitted on the first talk-back channel, and
switches to the second talk-back channel to transmit the recorded audio signal in response to communications received on the at least one non-primary channel when a release operation of the push-to-talk interface is detected; and
when the signal gain for the second microphone is larger than the signal gain for the first microphone,
switches to the second talk-back channel to transmit an audio signal corresponding to the received voice command in response to communications received on the at least one non-primary channel and concurrently records the audio signal being transmitted on the second talk-back channel, and
switches to the first talk-back channel to transmit the recorded audio signal in response to communications received on the primary channel when a release operation of the push-to-talk interface is detected.

20. The portable radio of claim 11, comprises one of a two-way communication radio and a remote speaker microphone (RSM) accessory coupled to the two-way communication radio, wherein the first and second microphones are located on different sides of the two-way communication radio or on different sides of the RSM accessory.

21. A method for automatically switching to a channel for transmission in a multi-watch mode on a portable radio, the method comprising:
receiving independent audio communications simultaneously on a primary channel and at least one non-primary channel when the portable radio communication device is operating in the multi-watch mode;
detecting a voice command signal received at first or second microphones residing in the portable radio;
determining a microphone parameter corresponding to the detected voice command signal for both the first and second microphones; and
in response to detecting the voice command signal:
switching to a first talk-back channel to respond to communications received on the primary channel when the microphone parameter of the first microphone is larger than the microphone parameter for the second microphone; and
switching to a second talk-back channel to respond to communications received on the at least one non-primary channel when the microphone parameter of the second microphone is larger than the microphone parameter for the first microphone.

22. The method of claim 21, wherein the microphone parameter comprises a signal gain, the signal gain being associated with the voice command being used to determine the switching.

23. The method of claim 21, wherein the first and second microphones are located on different sides of the portable radio.

24. The method of claim 21, wherein switching to the first talk-back channel or the second talk-back channel is automatically triggered without an activation of a channel control knob located in the portable radio.

\* \* \* \* \*